United States Patent
Pfitzer et al.

(10) Patent No.: US 10,145,030 B2
(45) Date of Patent: Dec. 4, 2018

(54) METHOD AND DEVICE FOR PRODUCING UNIDIRECTIONAL CARBON FIBRE CLOTH

(71) Applicant: Bayerische Motoren Werke Aktiengesellschaft, Munich (DE)

(72) Inventors: Hanno Pfitzer, Furth (DE); Franz Maidl, Wallerfing (DE); Michael Bechtold, Moensheim (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 168 days.

(21) Appl. No.: 14/885,171

(22) Filed: Oct. 16, 2015

(65) Prior Publication Data

US 2016/0032496 A1 Feb. 4, 2016

Related U.S. Application Data

(63) Continuation of application No. PCT/EP2014/056072, filed on Mar. 26, 2014.

(30) Foreign Application Priority Data

Apr. 18, 2013 (DE) .......................... 10 2013 206 983

(51) Int. Cl.
*D01F 9/32* (2006.01)
*B29B 11/16* (2006.01)
(Continued)

(52) U.S. Cl.
CPC .............. *D01F 9/32* (2013.01); *B29B 11/16* (2013.01); *D01F 9/14* (2013.01); *B29K 2105/0881* (2013.01); *B29K 2307/04* (2013.01)

(58) Field of Classification Search
CPC ......... D01F 9/32; D01F 9/14; B29K 2307/04; B29K 2105/0881; B29B 11/16
See application file for complete search history.

(56) References Cited

U.S. PATENT DOCUMENTS 4,428,992 A * 1/1984 Street ..................... B65H 69/02
156/158
4,803,762 A * 2/1989 Sheehan .............. B65H 69/061
156/158
(Continued)

FOREIGN PATENT DOCUMENTS

CA 2 820 131 A1 6/2012
CN 1401022 A 3/2003
(Continued)

OTHER PUBLICATIONS

Chinese Office Action issued in counterpart Chinese Application No. 201480008585.X dated Feb. 4, 2017 with English translation (22 pages).

(Continued)

*Primary Examiner* — Vishal I Patel
(74) *Attorney, Agent, or Firm* — Crowell & Moring LLP

(57) ABSTRACT

A method is provided for producing unidirectional carbon fiber cloth by providing a plurality of precursors, wherein each precursor has a plurality of individual filaments, carbonizing the plurality of precursors into a plurality of carbon fiber bundles, subsequently producing a unidirectional carbon fiber cloth from the plurality of carbon fiber bundles, and subsequently winding the unidirectional carbon fiber cloth produced. A device is provided for producing a unidirectional carbon fiber cloth having at least one heat treatment unit for carbonizing a plurality of precursors into a plurality of carbon fiber bundles, a connecting arrangement for producing the unidirectional carbon fiber cloth from the carbon fiber bundles created, and a back beam for winding the unidirectional carbon fiber cloth onto the back beam.

11 Claims, 1 Drawing Sheet

(51) Int. Cl.
*D01F 9/14* (2006.01)
*B29K 105/08* (2006.01)
*B29K 307/04* (2006.01)

(56) References Cited

U.S. PATENT DOCUMENTS

| | | | |
|---|---|---|---|
| 5,177,840 A | 1/1993 | Laws | |
| 6,187,434 B1 * | 2/2001 | Arai | D01F 9/145 |
| | | | 423/447.1 |
| 2003/0027471 A1 | 2/2003 | Shimazaki et al. | |
| 2006/0009302 A1 * | 1/2006 | Oyama | A63B 53/0466 |
| | | | 473/282 |
| 2007/0122687 A1 | 5/2007 | Sakurai et al. | |
| 2007/0196648 A1 * | 8/2007 | Endo | A63B 53/10 |
| | | | 428/367 |
| 2010/0260955 A1 * | 10/2010 | Hasegawa | A63B 53/10 |
| | | | 428/36.3 |

FOREIGN PATENT DOCUMENTS

| | | |
|---|---|---|
| CN | 1566426 A | 1/2005 |
| CN | 1878898 A | 12/2006 |
| CN | 102459728 A | 5/2012 |
| CN | 102912477 A | 2/2013 |
| DE | 20 2009 000 573 U1 | 7/2009 |
| EP | 2 441 866 A1 | 4/2012 |
| EP | 2441866 A1 * | 4/2012 ............... D01F 6/18 |
| JP | 2004-197230 A | 7/2004 |

OTHER PUBLICATIONS

Yao, "Textile Materials Science", China Textile & Apparel Press, Jan. 2009, three pages, Edition 3.
International Search Report (PCT/ISA/210) issued in PCT Application No. PCT/EP2014/056072 dated Jun. 24, 2014 with English translation (five pages).
German Search Report issued in counterpart German Application No. 10 2013 206 983.9 dated Nov. 27, 2013 with partial English translation (11 pages).
Chinese Office Action issued in counterpart Chinese Application No. 201480008585.X dated Jun. 3, 2016, with English translation (sixteen (16) pages).
Chinese-language Office Action issued in counterpart Chinese Application No. 201480008585.X dated Aug. 24, 2017 with English translation (Twenty-four (24) pages).
Chinese-language Office Action issued in counterpart Chinese Application No. 201480008585.X dated Dec. 5, 2017 with English translation (14 pages).

* cited by examiner

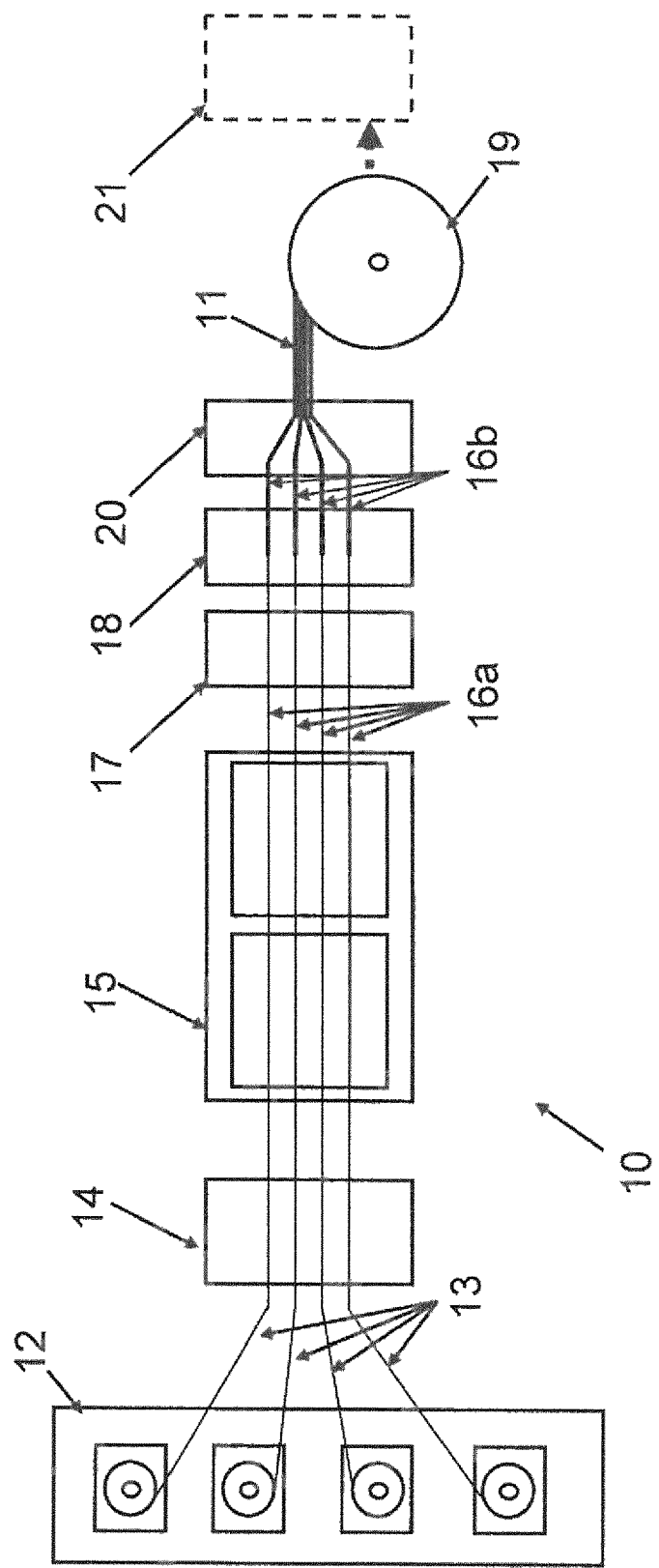

METHOD AND DEVICE FOR PRODUCING UNIDIRECTIONAL CARBON FIBRE CLOTH

CROSS REFERENCE TO RELATED APPLICATIONS

This application is a continuation of PCT International Application No. PCT/EP2014/056072, filed Mar. 26, 2014, which claims priority under 35 U.S.C. § 119 from German Patent Application No. 10 2013 206 983.9, filed Apr. 18, 2013, the entire disclosures of which are herein expressly incorporated by reference.

This application contains subject matter related to U.S. application Ser. No. 14/885,102, entitled "Method for Producing Carbon Fibers" filed on Oct. 16, 2015.

BACKGROUND AND SUMMARY OF THE INVENTION

The invention relates to a method for producing unidirectional carbon fiber cloths and to a device for the production thereof.

Carbon fibers are used for reinforcing plastic components of all types. This material is used in particular in aviation but also to an increased extent in the automobile industry in order to create particularly lightweight and nevertheless very robust components.

The production of carbon fibers is carried out in a complex process chain. Illustrated in very simplified form, the production process begins with the production of what is known as the "precursor", which is used as a starting material for the actual production process of the carbon fibers and usually describes a textile yarn which has a large number of individual filaments. The precursor is usually subjected to an oxidation treatment following its production. Here, the precursor passes through a first heat treatment in an oven, in which the precursor is alternately heated and then cooled. After that, the precursor is subjected to a second heat treatment at a temperature between 1600 and 1900° C. within the context of "carbonization", in order to produce a carbon fiber bundle from the precursor through chemical conversion.

Usually, the carbon fiber bundles produced in this way are wound up onto separate individual spools. The individual spools are compact and can therefore be transported easily to further processing. However, for the production of a cloth, several hundred individual spools are required, so that a set-up operation for populating an appropriate production system with the appropriate number of individual spools can take several hours. This leads to a considerably reduced availability of the system and a delay to following processes.

During such a procedure, because of the winding of the carbon fiber bundles onto the individual spools and the subsequent unwinding from the individual spools, it is not possible to prevent the fiber bundles from being damaged and thus their strength being weakened, so that weakened points arise, which have to be separated out in a complicated way in order to avoid subsequent defective components.

In addition, high requirements are placed on the winding device required for this purpose, since spreading the fiber bundle to a defined width, usually performed before the winding, is intended also to be maintained for the subsequent processing steps after the unwinding. However, this is extremely difficult, since, as a result of the winding and unwinding operations, it is possible for relative displacements of the individual fibers of the fiber bundle relative to one another to occur. For instance, individual fibers arranged in the edge regions of the fiber bundles can fold in in the direction of the center of the fiber bundle, so that these can no longer subsequently be spread out correctly or only with a relatively great deal of effort, and thus likewise cause defective points in the production of the cloth.

It is therefore an object of the invention to at least partly simplify the process chain of the carbon fiber production and the production of the cloth made therefrom, and to increase reliability.

This and other objects are achieved by a method and a device according to embodiments of the invention.

Accordingly, a method is provided for producing unidirectional carbon fiber cloths that includes at least the following acts:

a) providing a number of precursors, each precursor comprising a plurality of individual filaments, b) carbonizing the number of precursors to form a number of carbon fiber bundles;

c) producing a unidirectional carbon fiber cloth from the number of carbon fiber bundles; and d) subsequently winding the unidirectional carbon fiber cloth produced.

This means that at least two or more precursors are converted into carbon fiber bundles ("rovings") by means of carbonization. Preferably, during this procedure, the number of precursors corresponds to the number of carbon fiber bundles produced therefrom. Of course, a different numerical ratio can likewise be achieved by combining or dividing the precursors or the carbon fiber bundles.

A unidirectional carbon fiber cloth ("carbon cloth" for short) is then produced from the carbon fiber bundles and said cloth is wound up for further handling. A unidirectional carbon fiber cloth is to be understood in particular to mean a cloth made of unidirectionally arranged carbon fiber bundles. For example, these have what is known as a 0° alignment, that is to say are oriented in the direction of the extent of the cloth and aligned parallel to one another.

Preferably, the act of producing the unidirectional carbon fiber cloth is carried out immediately following the carbonization act. This is to be understood in such a way that no renewed winding or unwinding of the carbon fiber bundles onto/from individual spools is to be carried out between the two acts. Instead, the carbon fiber cloth is removed as an intermediate product from the production process of the carbon fibers. In particular, the production of the carbon fiber cloth can thus be carried out in a production line, and the carbon fibers can be protected in a particular way from weakening by unnecessary mechanical loadings.

As opposed to the known production of carbon fiber bundles and the processing thereof, no individual winding of each individual carbon fiber bundle onto a separate individual spool in each case is therefore carried out. Thus, the particularly complicated and error-prone winding of the individual fiber bundles is dispensed with, which means that the production process can be simplified and process reliability can be increased, so that defects in the cloth can be avoided. In addition, repeated deflection and winding onto the individual spools and subsequent unwinding of the carbon fiber bundles to produce intermediate products, such as cloths, for example, is avoided or the frequency thereof is reduced, and the fibers are thus less stressed and damaged. Overall, therefore, an improvement in the material properties can be achieved, which benefits the quality of the subsequent component. Moreover, the method proposed offers the special advantage of particular flexibility, since a surface density of the carbon fiber cloth can be varied as required immediately during the winding.

The winding step preferably includes winding the unidirectional carbon fiber cloth produced onto a back beam. Thus, an easy-to-handle and, in particular, easily storable and transportable unit is created, which already includes the cloth as an intermediate product for subsequent further processing. It is thus possible to dispense with interposed winding of the carbon fiber bundles onto individual spools. The subsequent further processing can likewise be carried out on site, in particular within the same production line or independently in time and space. In any case, the simple provision acts particularly advantageously on account of the back beam since the latter—as opposed to population with individual spools—permits rapid and simple population of a processing system.

Thus, it is possible for example for a step of unwinding the unidirectional carbon fiber cloth to be arranged downstream of the winding step, in order to process the unidirectional carbon fiber cloth further to form a semi-finished fiber product, in particular to form a cloth, prepreg, semi-finished thermosetting product and/or semi-finished thermoplastic product. The aforementioned semi-finished fiber products can include unidirectional or multi-directional structures.

Thus, in a common method, it is possible for a number of fabrication steps from the fiber production as far as the further processing thereof to form the semi-finished product to be integrated, by which means production sequences are optimized with regard to time, costs and outlay.

According to a further embodiment, the act of producing the unidirectional carbon fiber cloth includes an act of spreading the carbon fiber bundles and an act of connecting the spread carbon fiber bundles. Here, the respective fiber bundle is fanned out by a spreading unit to form a band with a defined width (in the following: spread carbon fiber bundle). The spread carbon fiber bundles are then connected to one another in the edge regions along their direction of extent. This can be carried out, for example, by way of friction or vibrations, so that the individual filaments of two adjacent carbon fiber bundles spread out in the form of a band slide into one another and interengage. Depending on the number of spread carbon fiber bundles arranged beside one another, a carbon fiber cloth with corresponding width results in this way.

According to a further preferred embodiment, the carbonization act includes an act of oxidizing the precursors and/or an act of the surface treating the carbon fiber bundles. Within the context of the oxidization act, the precursor is repeatedly heated and cooled in order to change the chemical structure of the precursor before the latter is carbonized. The surface treatment of the carbon fiber bundle is carried out, for example, after the precursor has been carbonized by applying what is known as a "size" to the carbon fiber bundle, which permits improved handling of the fiber bundles and improved adhesion of a matrix to the fibers.

Furthermore, a device for producing the unidirectional carbon fiber cloth is provided, comprising:
- at least one heat treatment unit for carbonizing a number of precursors to form a number of carbon fiber bundles;
- a connecting arrangement for producing the unidirectional carbon fiber cloth from the carbon fiber bundles produced; and
- a back beam for winding the unidirectional carbon fiber cloth onto the back beam.

For example, the heat treatment unit used is one or more ovens, which provide appropriate heat for the carbonization. The connecting arrangement is configured to connect the individual carbon fiber bundles according to the preceding description to one another to form a carbon fiber cloth.

According to a further embodiment, a spreading unit for spreading out the carbon fiber bundles is connected upstream of the back beam. This therefore means that the spreading unit can be provided between the heat treatment unit and the connecting arrangement.

In addition, an impregnation unit for impregnating the unidirectional carbon fiber cloth can be connected downstream of the back beam. Thus, following the winding of the back beam, further processing can be carried out by impregnating the carbon fiber cloth, for example in order to create prepregs.

In addition, the device can additionally comprise a providing unit for providing the number of precursors, an oxidizing unit for oxidizing the precursors and/or a surface treatment unit for the surface treatment of the carbon fiber bundles.

For example, the providing unit is connected upstream of the heat treatment unit. The optional oxidizing unit is preferably likewise arranged before the heat treatment unit but following a providing unit that may possibly be provided. The surface treatment unit can, for example, be provided following the heat treatment unit.

Overall, the integration of the back beam into the device described makes it possible to dispense with a multiplicity of individual spools and corresponding deflections, as a result of which, apart from a reduced outlay on setting up, a reduction in the damage to the fibers and thus a considerable improvement in the cloth quality is additionally achieved.

The invention will be explained in more detail below with reference to the single figure, by using an exemplary embodiment.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic diagram of a unidirectional carbon fiber cloth producing device according to an exemplary embodiment of the invention.

DETAILED DESCRIPTION OF THE DRAWING

FIG. 1 is a purely schematic illustration of a device 10 for producing a unidirectional carbon fiber cloth 11, having a providing unit 12 for providing a number of precursors 13, which are fed to a following heat treatment unit 15 (for example, in the form of two ovens) for the intense heating of the number of precursors, in order to carbonize the latter to form a number of carbon fiber bundles 16a. Of course, one or more ovens can be provided.

The device 10 additionally has a spreading unit 18 for spreading out the carbon fiber bundles 16a to form band-like or spread carbon fiber bundles 16b with a defined width, the spread carbon fiber bundles 16b being connected to one another in a connecting arrangement 20 in order to produce the unidirectional carbon fiber cloth 11. The carbon fiber cloth 11 is then fed to a back beam 19. Here, the unidirectional carbon fiber cloth 11 is wound onto the back beam 19.

In addition, in the embodiment illustrated, the device 10 additionally has an oxidizing unit 14 for oxidizing the precursors 13 and a surface treatment unit 17 for the surface treatment of the carbon fiber bundles 16a. Within the scope of the oxidation act, the precursor 13 is repeatedly heated and cooled in order to change the chemical structure of the precursor 13.

On the other hand, the surface treatment of the carbon fiber bundle 16a is carried out, for example, downstream of the heat treatment unit 15 by applying what is known as a "size", which permits improved handling of the fiber bundles and improved adhesion of a matrix to the fibers.

In addition, an impregnation unit (21) for impregnating the unidirectional carbon fiber cloth (11) can be connected downstream of the back beam (19).

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing unidirectional carbon fiber cloths, the method comprising the acts of:
    providing a number of precursors, each precursor comprising a plurality of individual filaments;
    carbonizing the number of precursors to form a number of carbon fiber bundles;
    immediately following the carbonizing act, producing a unidirectional carbon fiber cloth from the number of carbon fiber bundles by way of connecting the carbon fiber bundles to one another side-by-side along a longitudinal direction of the carbon fiber bundles in the unidirectional carbon fiber cloth, where no winding or unwinding of the carbon fiber bundles onto or from a spool is performed between the carbonizing act and the producing act of the unidirectional carbon fiber cloth; and
    subsequently winding the unidirectional carbon fiber cloth that is produced, which unidirectional carbon fiber cloth is to be unwound for a further processing of the unidirectional carbon fiber cloth.

2. The method according claim 1, wherein the winding act comprises the act of winding the unidirectional carbon fiber cloth produced onto a back beam.

3. The method according to claim 1, further comprising the act of:
    unwinding the unidirectional carbon fiber cloth downstream of the winding act, in order to further process the unidirectional carbon fiber cloth to form a semi-finished fiber product.

4. The method according to claim 3, wherein the semi-finished fiber product is one of a cloth, prepeg, semi-finished thermosetting product, or semi-finished thermoplastic product.

5. The method according to claim 2, further comprising the act of:
    unwinding the unidirectional carbon fiber cloth downstream of the winding act, in order to further process the unidirectional carbon fiber cloth to form a semi-finished fiber product.

6. The method according to claim 5, wherein the semi-finished fiber product is one of a cloth, prepeg, semi-finished thermosetting product, or semi-finished thermoplastic product.

7. The method according to claim 1, wherein the act of producing the unidirectional carbon fiber cloth comprises the acts of spreading the carbon fiber bundles and connecting the spread carbon fiber bundles.

8. The method according to claim 6, wherein the act of producing the unidirectional carbon fiber cloth comprises the acts of spreading the carbon fiber bundles and connecting the spread carbon fiber bundles.

9. The method according to claim 1, wherein the carbonization act further comprises the act of oxidizing the precursors and/or the act of surface treating the carbon fiber bundles.

10. The method according to claim 8, wherein the carbonization act further comprises the act of oxidizing the precursors and/or the act of surface treating the carbon fiber bundles.

11. The method according to claim 1, wherein the act of producing the unidirectional carbon fiber cloth comprises the act of connecting the carbon fiber bundles to one another by way of friction or vibration.

\* \* \* \* \*